Fig. 8.

United States Patent Office 3,186,811
Patented June 1, 1965

3,186,811
METHODS OF AN APPARATUS FOR CORRECTING A DEVIATION FROM TRUE FORM OF A CASTING ROLL
William Arthur Lightfoot, Banby Dun, near Doncaster, England, assignor to Pilkington Brothers Limited, Liverpool, England, a company of Great Britain
Filed Mar. 24, 1960, Ser. No. 17,278
11 Claims. (Cl. 65—29)

This invention relates to methods of and apparatus for correcting deviations from original form of a casting roll, such as is used in the manufacture of flat glass in continuous ribbon form.

In the usual method of manufacturing rolled flat glass, the molten metal is flowed from the spout of a glass melting furnace into the pass between two rolls, usually referred to as "casting rolls," and whose function is to regulate the thickness of the ribbon of glass which emanates from the other side of the pass from that to which the molten glass is flowed, and this operation is sometimes referred to as "sizing." The rolls are continuously water cooled because of the high temperature involved, but as such rolls are slow moving members rotating at a speed of the order of 1 to 20 revolutions per minute, there are persistent differences in the temperature in different parts of the roll, and this, amongst other things, has a tendency to cause one or both of the rolls to bend axially when in use.

In our British patent specification No. 722,554 we have described and claimed a method of forming a ribbon of glass by pouring the molten glass from a cambered spout shaped so that the glass leaving the spout has a uniform thickness, the ribbon form of glass being delivered on to a casting roll provided with marginal rolls for the ribbon which rolls assist in advancing the ribbon from the casting roll.

The tendency to bow occurs more in an upper casting roll than in the lower roll because the upper roll is subjected to greater temperature fluctuations.

When bowing occurs, the glass ribbon produced from the sizing rolls varies in thickness a regular intervals, so that instead of the desired flatness, a shallow undulating formation persists until the deformation has been eliminated.

As above indicated, differences of temperature in different sections of a roll is not the only cause of deviations from original form. This deviation may be caused by one or more of the following circumstances occurring:

Local differences in the surface emissivity of the roll;
Local differences in the coefficient of heat transfer from the molten glass to the roll;
Variations in the roll wall thickness;
Local variations in the coefficient of heat transfer from the inner periphery of the roll to the cooling water;
Local variations in the conductivity of the roll material;
Local variations in the specific heat of the roll material;
Local variations in the specific gravity of the roll material;
Local variations in the flow of the internal cooling water, or
Distortion due to ageing of the roll material.

Continual efforts have been made, over many years, to find a practical means of overcoming these disabilities in casting rolls.

It is a main object of the present invention to provide an improved apparatus for use with a casting roll which will detect deviations from original form, and will, as a result of the detection, immediately mitigate the tendency and return the roll to pristine condition.

A further object is to devise an improved form of apparatus which is readily applicable to a casting roll whether the roll is one on which the molten glass is flowed to form a ribbon of uniform cross section, or a casting roll employed in a sizing operation as already explained particularly the lower roll.

The present invention provides a method of correcting physical deviations from the original form of a casting roll used in the manufacture of flat glass in continuous ribbon form by directing cooling streams of progressively graduated volume along a generatrix of the roll the volume of medium so directed being varied in proportion to the degree of asymmetry of the deviation being sensed.

Streams of the cooling medium may be continuously directed on to the roll and when a deviation is sensed the volume of medium is progressively increased from a datum volume used when the roll is in original form, and the volume of medium is progressively returned to datum volume when the deviation is no longer sensed.

The present invention also consists in apparatus for correcting deviations from original form of a casting roll used in the manufacture of flat glass in continuous ribbon form comprising stream forming means and a source of supply of a cooling medium for each roll treated, a pipe connection between the respective stream forming means and the source of supply, a balanced valve incorporated in the pipe connection, a proportional lever of which the long arm is disposed to open the valve and means connected to the short arm of the said lever for feeling a physical deviation on the respective roll, whereby the valve is sensitive to the deviation sensed by the feeling means and communicated to the valve by the lever, said feeling means being disposed behind the stream forming means considering the sense of rotation of the roll.

Preferably the proportional lever is mounted on a fulcrum pin comprising a journal part slightly eccentric to the pin, the journal part being mounted in a bearing carried by the lever and means are provided for angularly setting the journal part in the bearing to finely adjust the feeling means to the casting roll and to vary the adjustment as wear takes place on the feeling means.

In the application of the invention to an upper casting roll the proportional lever may be actuated by a rigid link carrying the feeling means, said link being mounted on a carriage which is settable with respect to the roll, and settable means, associated with the carriage, including an abutment which is fixed with respect to the roll, provided for adjusting the distance of the carriage from the roll to axially displace the link and vary the adjustment of the feeling means to the roll.

Preferably the link is slung within a cylinder to permit slight axial displacement therein and the carriage carries a fulcrum for the cylinder and to each side of the fulcrum a bridge straddling the cylinder is mounted on the carriage, said bridges each carrying set screws adapted to bear on the cylinder for adjusting and fixing the angle of tilt of the link about the fulcrum with respect to a tangent at the line of contact between the feeling member and the roll.

Apparatus according to the invention may comprise a flexible pipe connection between the valve and the stream forming means, and the stream forming means may be mounted on a slotted arcuate plate on which it is slidably adjustable to set the stream forming means circumferentially of the roll to allow for time lag between building up the desired pressure of the cooling volume passing from the valve to the stream forming means and the sensing of a deviation.

In the application of the invention to an upper casting roll the stream forming means may be constituted by an apertured pipe having closed ends and a linear series of apertures through which the cooling means is discharged to the casting roll, a medial rigid branch pipe leading from the apertured pipe as a support therefor passing through the wall of a water tube, the latter having connections for circulating cooling water therethrough, the branch leading to a pipe co-axial with the water tube and returning through the wall of the water tube for connection to the outlet from the balanced valve whereby the cooling medium is given the desired temperature as it issues from the apertured pipe.

As has already been indicated the lower casting roll is carried on headstocks mounted on the supporting bed and because of the hot conditions there is a tendency in the bed to deform upwardly under excessive heat conditions. In order to assure accuracy of working in such circumstances the balanced valve and the proportional lever are supported on a water cooled hollow element forming a rigid bridge between the headstocks in which the supports for the roll are maintained whereby a support of substantially constant temperature for the feeling means, proportional lever and balance valve is obtained.

Preferably the bridge is mounted on brackets carried by that part of the bed near to the respective headstock.

From another aspect the present invention comprises apparatus for correcting deviations from original form of a lower casting roll used in the manufacture of flat glass in continuous ribbon form, comprising a water cooled bridge connecting fixed supports juxtaposed to the roll bearings, a proportional lever including short and long arms, supported by the bridge on a pivot near to the underside of the roll, feeling means carried by the short arm of the lever disposed to engage the underside of the roll, a balanced valve operatively connected to the long arm of the lever, a conduit controlled by the valve, a linear series of nozzles mounted near the underside of the roll in a plane containing the axis of the roll and the generatrix on which the streams impinge, said nozzles being connected by said conduit, whereby deviations discovered by the feeling means cause a predetermined proportional flow of cooling medium through said nozzles by actuating said valve, and resilient means tending to reset the valve to datum position.

In order that the invention may be more clearly understood, embodiments thereof will now be described, by way of example, with reference to the accompanying drawings in which:

FIGURES 5, 6 and 7 are detail views showing the means for setting the feeling means in contact with the roll e.g. to compensate for wear of which FIGURE 11 shows in perspective view an arcuate mounting for the stream forming means and FIGURE 12 is a perspective view of the arcuate carrier for the stream forming means which is supported on the arcuate mounting shown in FIGURE 10, and FIGURES 13, 14 and 15 are detail views showing in elevation, plan and end elevation respectively a modification comprising water cooling means for regulating the temperature of the cooling streams directed into an upper roll;

In the drawings like references designate the same or similar parts.

Figure 1:
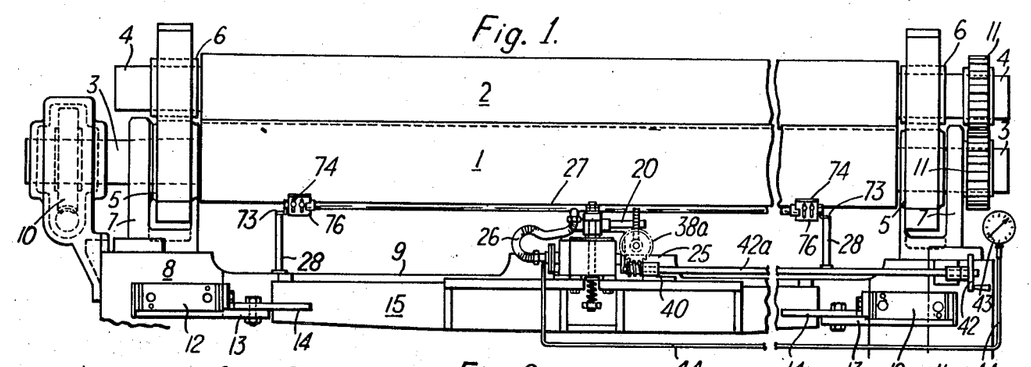
FIGURE 1 is a diagrammatic longitudinal elevation showing a feeler control in accordance with the invention for the lower roll of a pair, and indicating a feeler control associated with the upper roll.
Figure 2:
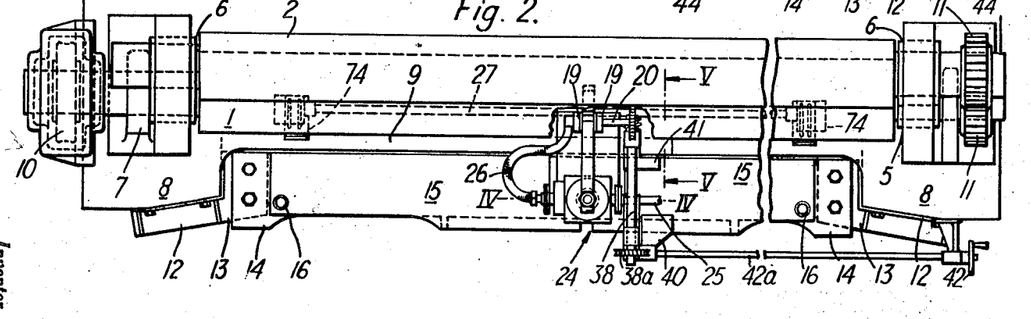
FIGURE 2 is a plan view thereof.
Figures 3, 4:
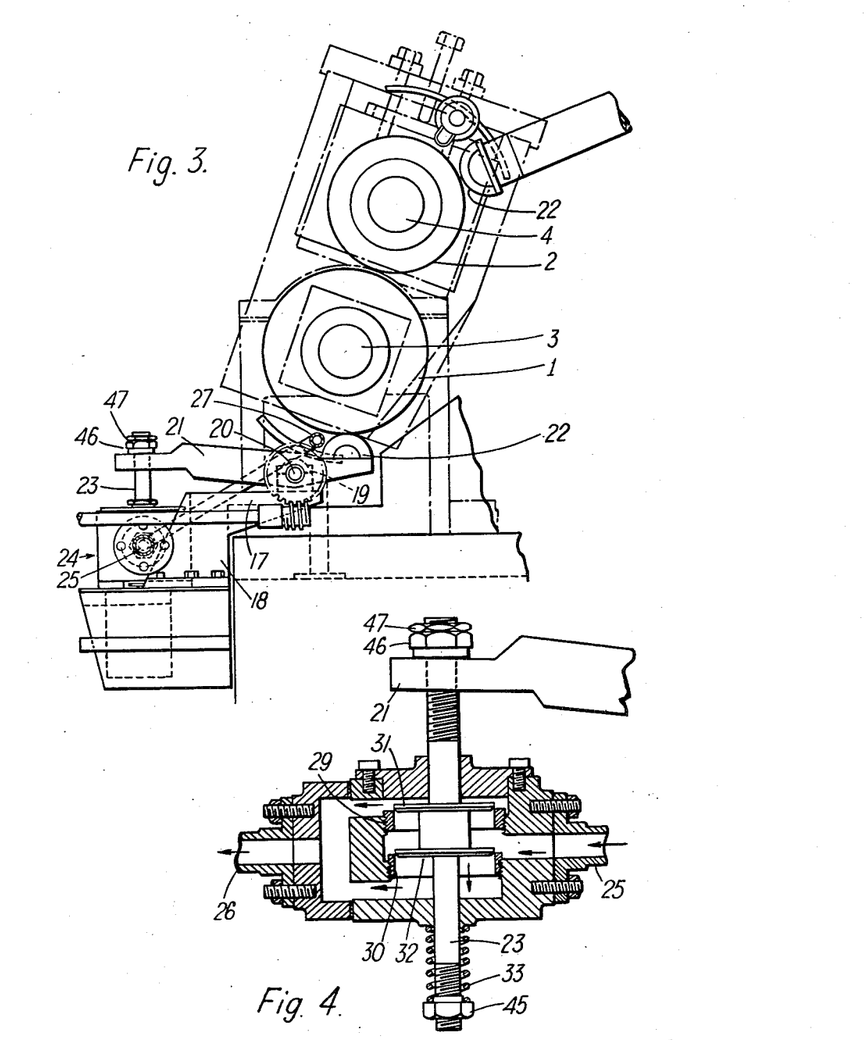
FIGURE 3 shows in side elevation the apparatus illustrated in FIGURES 1 and 2, the supports for the roll being indicated in broken lines for the sake of clearness.
FIGURE 4 shows in sectional elevation on the line IV—IV of FIGURE 2 the balanced valve included in the apparatus.

In FIGURES 1 to 3 of the drawings is shown a conventional pair of casting rolls, comprising a lower roll 1 and an upper roll 2, the axles 3, 3 and 4, 4 of which are carried in bearings 5, 5 and 6, 6 respectively mounted in headstocks 7, 7 set up on beds 8, 8 integral with a beam 9 which extends under the lower roll 1. The lower roll 1 is power driven through worm gearing 10 and the power is transmitted to the upper roll by pinions 11, 11.

In the vicinity of each headstock, brackets 12, 12 are fixed to the respective beds 8, 8 each bracket having an arm 13, the arms 13 being in one horizontal plane, and to each arm is bolted a plate 14 welded to an end of a water box 15. To maintain this water box at a substantially constant temperature water is circulated through connections indicated at 16, 16. Thus a water cooled rigid bridge is fixed between the beds 8, 8 and the flat upper face is horizontal.

Mounted on the water box and on the medial vertical plane of the roll 1 is a platform 17 carried on sideplates 18 bolted to the water box and on to the platform is bolted pedestal bearings 19, 19 which carry the fulcrum pin 20 of a proportional lever 21 so that it may rock in a vertical plane. The short arm of the lever carries a feeler 22 which touches the roll 1 on a profile at right angles to the roll axis and the long arm is connected to the valve spindle 23 of a balanced valve generally indicated at 24, the arrangement being such that as the feeler senses a deviation in roll 1 from original form the proportional lever is rocked and actuates the valve 24.

The valve controls the passage of cooling air from a supply line indicated at 25 through a flexible line 26 to a pipe 27 provided with a linear series of nozzles and extending in parallelism with the roll 1 for the major part of its length, the pipe being carried by supports 28 secured to the water box 15 and hereinafter more fully described.

Thus immediately a deviation passes the feeler the valve is actuated, and at once a progressively increasing volume of cooling air is projected at the roll until the highest point of eccentricity is reached and thereafter the volume is progressively decreased until the lowest point of eccentricity is reached, so that a cooling volume is applied to the roll which assures dissolution of the deviation and returns the roll shape to pristine form, the air volume applied varying as the degree of asymmetry in the deviation being sensed varies.

As clearly shown in FIGURE 4 the balanced valve is a double beat valve having two concentric seatings 29 and 30 of which the seating 29 is of somewhat larger diameter than the seating 30 engaged by corresponding disc valves 31 and 32 both secured to the valve spindle 23 which passes freely through the valve casing.

The setting of the valve is such that the valve 31 is slightly open when the valve 32 is on its seating thus a minimum flow of cooling air is maintained from the pipe 27 until a physical deviation occurs, and as the flow of air through the valve is in the direction in which the air pressure tends to open the valve 31 the flow through pipe 26 is varied immediately the lever 21 is rocked.

This minimum flow may be regarded as a datum flow from which, due to the sensitivity of the valve, the flow progressively increases in volume immediately a deviation is discovered by the feeler and the proportional lever 21 is increasingly rocked, thereafter the volume progressively decreases back to datum value as the lever returns to pristine position under the influence of a helical spring 33 in which sufficient energy is conserved as the valve is opened to reset the valve, and at all times to keep the feeler in contact with the roll.

Figure 5:
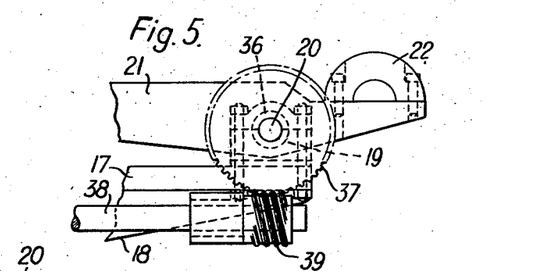
FIGURE 5 is a fragmentary elevation taken on the line V—V of FIGURE 2
Figures 6, 7, 9, 10:
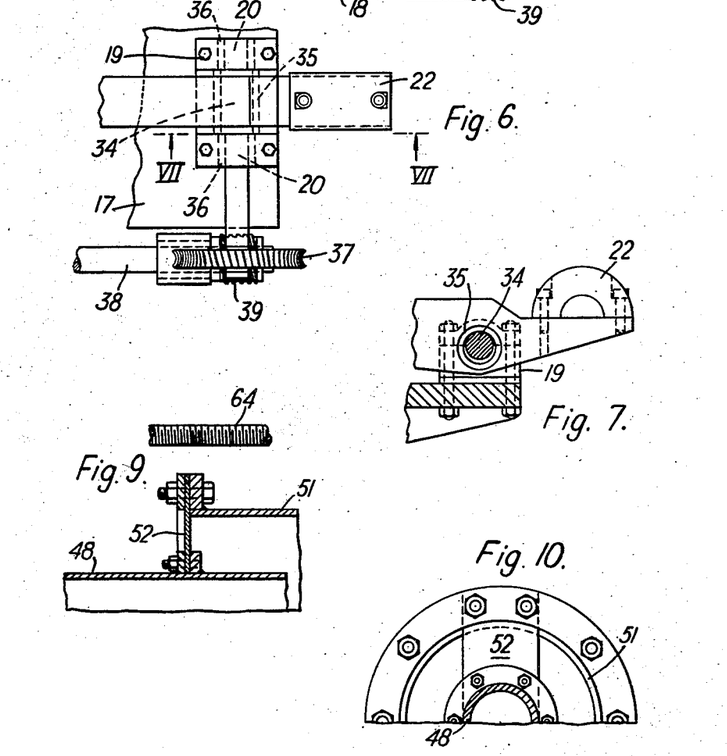
FIGURE 6 is a plan thereof.
FIGURE 7 is a sectional elevation on the line VII—VII of FIGURE 6.
FIGURES 9 and 10 are fragmentary drawings showing details of the mounting for the link carrying the feeling means, FIGURE 9 being a sectional elevation and FIGURE 10 an end view.

In FIGURES 5, 6 and 7 means for adjusting the feeler to the roll and to take up for wear are illustrated in detail, the adjustments being provided in order that the datum flow through the valve is permitted and the progressive variations in flow achieved and the sensitivity of the apparatus maintained.

In this embodiment the feeler 22 is a carbon pad in the form of a half annulus providing line contact with the roll, thus a rolling system which necessitates lubrication is entirely avoided and wear is almost eliminated.

The fulcrum pin 20 of the proportional lever comprises a journal part 34 which is slightly eccentric (e.g. throw of 1/8") in relation to the axis of the pin itself so that by rotation of the pin a fine adjustment of the feeler to the roll is obtainable. The journal 34 is carried in a carbon bearing bush 35 fitted in the lever 21, and carbon sleeves 36, 36 are fitted in plummer blocks of the bearings 19 which carry the pin 20.

To effect a regulating rotation of the fulcrum pin a relatively large worm wheel 37 is keyed to the pin 20, and a lay shaft 38 provided with a worm 39 is mounted in bearings carried by brackets 40, 41, (FIGURES 1 and 2). The lay shaft 38 is connected by gearing 38a to a rod 42a to which a hand wheel 42 is secured and is actuated to rotate the lay shaft 42a. The hand wheel 42 is arranged near to a pressure gauge 43 on which can be read the pressures occurring in the outlet pipe 26 from which a pipe line 44 is taken to the gauge, and desired adjustments readily made.

In setting up the apparatus the feeler 22 is brought into line contact with the roll 1 and the desired valve setting is obtained by adjusting the position of the nut 45 on the spindle so that the spring 33 holds the valve 31 clear of the seating and the desired datum pressure is read on the gauge then a nut 46 on the spindle is moved down to the long arm of the lever and held in the setting on the spindle by the lock nut 47.

Figure 8:
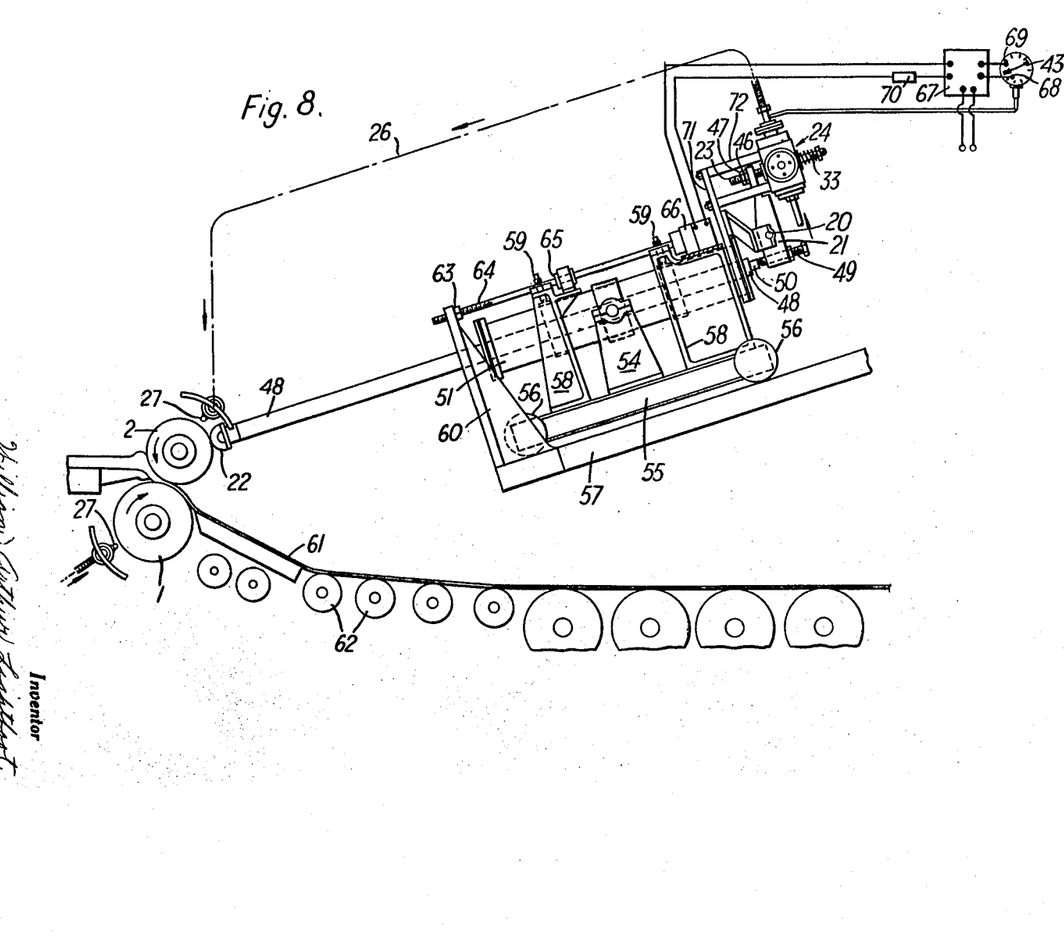
FIGURE 8 is a diagrammatic elevation showing the application of the invention to an upper casting roll.

In FIGURE 3 of the drawings a feeler 22 is shown engaging the upper roll 2 to indicate that a feeler may be applied to each of the rolls 1 and 2 and in FIGURE 8 of the drawings the preferred arrangement of mounting the feeler for the upper roll is shown.

In this arrangement the feeler 22 engaging the upper roll 2 is mounted on a tube 48 by which the feeler is directly connected to the short arm of a proportional lever 21 of which the long arm engages the valve spindle 23 of a balanced valve 24 the spindle having a spring 33 which keeps the short arm engaging the tube 48 a locking set-screw 49 being provided to assure the desired relationship of the tube and lever throughout adjustment of the valve setting, the tube 48 being provided with a plug 50 on which the set-screw 49 bears. Thus the tube 48 forms a rigid link between the feeler and the proportional lever 21.

The tube 48 is slung within an open ended cylinder 51 and at each end is a diametrically disposed spring steel strip 52 (see FIGURES 9 and 10) which flexibly connects the tube 48 with the cylinder.

The cylinder is centrally supported by trunnions 53 carried in two brackets 54, one to each side of the cylinder, and mounted on a carriage 55 having wheels 56 which run on rails 57.

The spring plates 52 provide substantially frictionless mounting for the tube 48 to allow for slight axial movement (e.g. .001 to .0015 inch) of the carriage.

To adjust the angle of tilt of the cylinder with respect to the carriage the latter is provided with two bridges constituted by two inverted U shaped brackets 58, 58 one to each side of the trunnion 53 and set-screws 59, 59 are mounted in the bridges to adjustably bear on the cylinder thus the angle of tilt in a vertical plane may be precisely adjusted and set.

The forward limit position of the carriage 55 is determined by an abutment 60 mounted on the rails 57 which latter may be built on to the lehr end (not shown) into which a ribbon of glass 61 advanced from the casting rolls 1, 2 is carried by rollers 62, as well known in the art of rolling flat glass.

On the abutment 60 is welded a threaded boss 63 through which passes the threaded end of a shaft 64 supported in a bearing 65 mounted on one of the bridges 58, the other end of the shaft 64 constituting the output shaft of a reversible motor 66. Thus by driving the motor in one direction the shaft is rotated to advance the carriage and in the other direction to retract the carriage from the abutment 60.

Current is supplied to the starter circuit of motor 66 by a relay indicated at 67 and this relay is electrically connected to contacts 68, 69 on the pressure gauge 43, so that when minimum pressure in the flexible line 26 falls below a prescribed minimum the contact 68 is closed by the indicator needle and the relay operated to drive the motor 66 so that the output shaft 64 is rotated in a sense to advance the carriage, and the tube 48 and feeler 22 towards the roll 2. If on the other hand the minimum outlet pressure is too high the contact 69 is closed and the motor reversed to retract the feeler 22 from the roll 2.

Each operation of the motor is of very limited duration and is under control of a time switch indicated at 70 and which may be constituted by a bi-metallic switch or of other form (as will be well understood in the electrical art) the duration being for example 30 seconds, the switch operating at intervals of say ten minutes when either contact is closed, while the speed of rotation of the shaft 64 is very slow, e.g. about 0.1 of a revolution per minute and the threaded end of the shaft has a fine pitch. So long as the minimum outlet pressure remains within the prescribed minimum and maximum limits the contacts remain closed.

In the construction just described the bracket 18 which carries the platform 17 on which the proportional lever is mounted and the valve 24 is carried rigidly on the cylinder 51 by an end plate 71 on which the bracket 18 is secured and which also carries supports 72 for the valve casing.

According to the invention means are provided to adjust the cooling pipe 27 circumferentially of the roll 1, or the roll 2 as the case may be, to take care of the time lag which occurs while the pressure builds up in the delivery pipe and in the cooling pipe in response to the extent of the opening of the valve 24 when a deviation is detected.

The time lag will correspond to a circumferential distance on the casting roll which will vary according to the speed of rotation of the roll 1.

Figure 11:
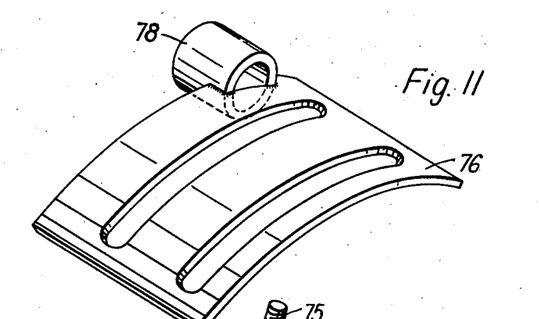

To this end each support 28 for the pipe 27 associated with the bottom roll 1 (see FIGURE 1) has attached thereto a bracket 73 (FIGURE 12) which carries an arcuate plate 74 provided with studs 75, and a slotted arcuate plate 76 (FIGURE 11) corresponding to the plate 74 mounted on the plate 74, so that the plates may be moved relatively to one another and then clamped in position by nuts 77 on the studs 75.

Figures 12, 13, 15:
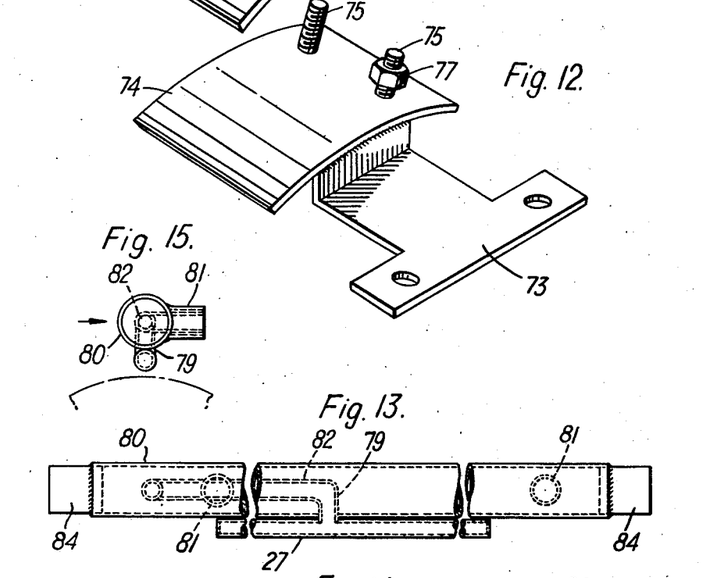
Figure 14:
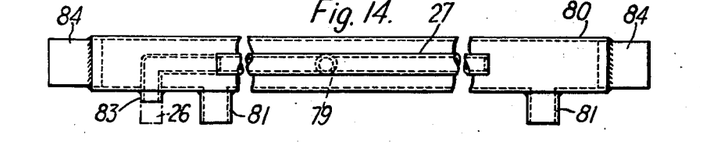

As regards the cooling pipe 27 this may be supported by bosses 78 formed on the slotted plate 76 and the cooling pipe 27 may have, as clearly shown in FIGURES 13, 14 and 15, a medial branch 79 which enters a water pipe 80 having connections 81, 81 through which water is circulated to keep cool the air being supplied to the pipe 27. The branch 79 joins a pipe 82 coaxial with the water pipe 80 and is returned through the water pipe to form a connector 83 projecting from the water pipe, to which the air outlet line 26 may be connected. Thus the cooling medium projected from the pipe 27 to the upper roll 2 is maintained at the temperature desired in spite of the ambient high temperature conditions.

Each end of the water pipe is provided with stubs 84 which fit into the bosses 78.

Figure 16:
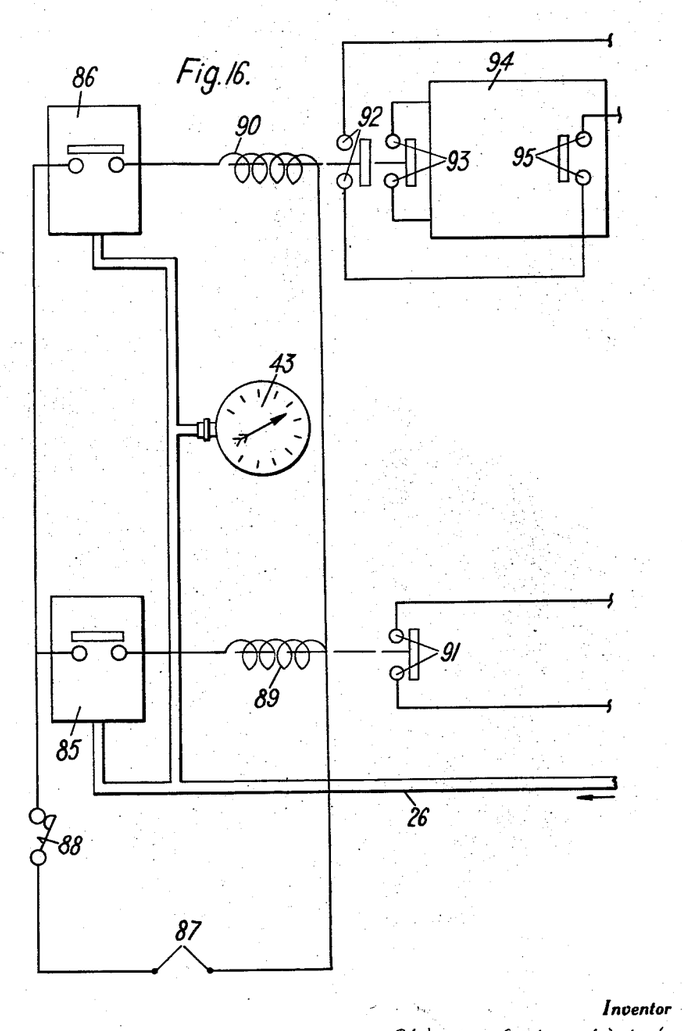
FIGURE 16 which is a circuit diagram illustrating a modification of a circuit shown in FIGURE 8.

An alternative circuit for operating the motor 66, FIGURE 8, is illustrated in FIGURE 16. The flexible line 26 is connected to two pressure-operated switches 85 and 86. The switch 85 closes when the pressure in the line falls below a lower limit, and the switch 86 closes when the pressure rises above an upper limit. The two limits may be, for example, 3 lbs. per square inch and 10 lbs. per square inch.

The switches 85 and 86 are connected in parallel across a current supply 87 which includes a manually-operable main switch 88. Relay coils 89 and 90 are respectively connected in series with the switches 85 and 86.

When the switch 85 is closed the coil 89 is energised and closes contacts 91 which are connected to the starter circuit of the motor 66 which then operates to advance the feeler 22 towards the roll 2.

When the switch 86 closes to energise the coil 90, two sets of contacts 92 and 93 are closed. Contacts 93 are connected to a time switch 94, and at a predetermined time after the closing of the contacts 93, contacts 95 in the time switch 94 close and a further circuit is completed to the starter of motor 66 which then retracts the feeler 22 from the roll 2.

The time switch 94 is used to present the retraction of the feeler when the pressure in the line 26 rises considerably above its datum value during part of a revolution of the roll.

The time switch 94 is used to present the retraction of the feeler when the pressure in the line 26 rises considerably above its datum value during part of a revolution of the roll.

I claim:

1. Apparatus for correcting deviations from original form of a casting roll used in the manufacture of flat glass in continuous ribbon form, comprising stream forming means arranged for directing cooling streams along a generatrix of the roll, a source of supply of a cooling medium for each roll to be corrected, a pipe connection between the respective stream forming means and the source of supply, a balanced valve incorporated in the pipe connection, a proportional lever of which the long arm is disposed to open the valve and feeling means connected to the short arm of the said lever for feeling a physical deviation on the respective roll, said feeling means being disposed behind the stream forming means considering the sense of rotation of the roll, and the balanced valve being sensitive to the degree of asymmetry of the deviation sensed by the feeling means and communicated to the valve by the lever to graduate the volume of said cooling streams progressively in proportion to said degree of asymmetry.

2. Apparatus according to claim 1, characterised in that the proportional lever is mounted on a fulcrum pin comprising a journal part slightly eccentric to the pin, the journal part being mounted in a bearing carried by the lever and means are provided for angularly setting the journal part in the bearing to finely adjust the feeling means to the roll and to vary the adjustment as wear takes place on the feeling means.

3. Apparatus according to claim 1, for correcting a physical deviation from original form of an upper casting roll, characterised by the proportional lever being actuated by a rigid link carrying the feeling means, said link being mounted on a carriage which is settable with respect to the roll, and settable means, associated with the carriage, including an abutment which is fixed with respect to the roll, provided for adjusting the distance of the carriage from the roll to axially displace the link and vary the adjustment of the feeling means to the roll.

4. Apparatus according to claim 3, wherein the link is slung within a cylinder to permit slight axial displacement therein and the carriage carries a fulcrum for the cylinder and to each side of the fulcrum a bridge straddling the cylinder is mounted on the carriage, said bridges each carrying set screws adapted to bear on the cylinder for adjusting and fixing the angle of tilt of the link about the fulcrum with respect to a tangent at the line of contact between the feeling member and the roll.

5. Apparatus according to claim 1, characterised by a flexible pipe connection between the valve and the stream forming means, and the stream forming means is mounted on a slotted arcuate plate on which it is slidably adjustable to set the stream forming means circumferentially of the roll to allow for time lag between building up the desired pressure of the cooling volume passing from the valve to the stream forming means, and the sensing of a deviation.

6. Apparatus according to claim 1 for correcting a physical deviation from original form of an upper casting roll, wherein the stream forming means is constituted by an apertured pipe having closed ends and a linear series of apertures through which the cooling means is discharged to the casting roll, a medial rigid branch pipe, leading from the apertured pipe as a support therefor, passing through the wall of a water tube, the latter having connections for circulating cooling water therethrough, the branch leading to a pipe coaxial with the water tube and returning through the wall of the water tube for connection to the outlet from the balanced valve whereby the cooling medium is given the desired temperature as it issues from the apertured pipe.

7. Apparatus according to claim 1 for correcting a physical deviation from original form of a lower casting roll wherein the stream forming means, the balanced valve and the proportional lever are supported on a water cooled hollow element forming a rigid bridge between headstocks in which the bearings for the roll are maintained whereby a support of substantially constant temperature for the feeling means, proportional lever and balance valve is obtained.

8. Apparatus for correcting deviations from original form of a lower casting roll used in the manufacture of flat glass in continuous ribbon form, comprising a proportional lever including short and long arms, supported on a pivot near to the underside of the roll, feeling means carried by the short arm of the lever disposed to engage the underside of the roll, a balanced valve operatively connected to the long arm of the lever, a conduit controlled by the valve, a linear series of nozzles mounted near the underside of the roll in a plane containing the axis of the roll and the generatrix on which the streams impinge, said nozzles being connected by said conduit, whereby deviations discovered by the feeling means cause a predetermined proportional flow of cooling medium through said nozzles by actuating said valve, and resilient means tending to reset the valve to datum position.

9. A method of correcting physical deviations from the original form of a casting roll used in the manufacture of flat glass in continuous ribbon form, by continuously directing streams of cooling medium on to the roll surface along a generatrix of the roll throughout the rotation of the roll, and progressively varying the volume of cooling medium so directed in proportion to the degree of asymmetry of the deviation being sensed.

10. Apparatus for connecting deviations from original form of a casting roll used in the manufacture of flat glass in continuous ribbon form, comprising means for directing cooling medium on to a generatrix of the roll, a source of supply of cooling medium, a continuously open balanced control valve connecting said supply source to said directing means, a sensing element bearing on the roll, and a linkage connecting the sensing element to the valve to transmit movement of the sensing element to the valve, said linkage being arranged to maintain a normal open setting of the balanced valve at which there is a minimum continuous flow of cooling medium through the valve and being operable to vary the throw of the valve depending on the degree of asymmetry of the deviation sensed thereby to vary progressively the flow of cooling medium to correct the deviation.

11. A method according to claim 9, wherein when a deviation is sensed the volume of cooling medium is progressively increased from a minimum continuous volume used when the roll is in original form, and the volume of cooling medium is progressively returned to minimum continuous volume when the deviation is no longer sensed.

References Cited by the Examiner
UNITED STATES PATENTS 2,691,851  10/54  Davison et al. ---------- 65—162
2,696,698  12/54  Davison et al. ---------- 29—401

DONALL H. SYLVESTER, *Primary Examiner.*
IVAN R. LADY, *Examiner.*